Aug. 17, 1926.
G. W. MURPHY
AUTO SEMI-SHADE
Filed March 5, 1925
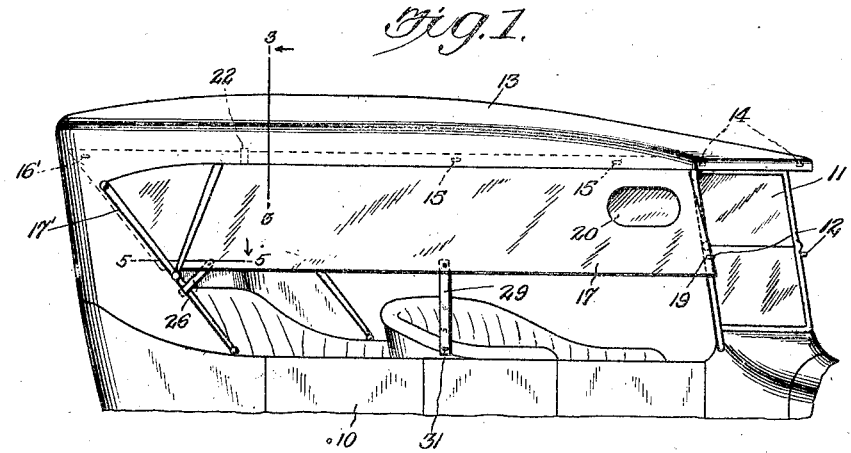
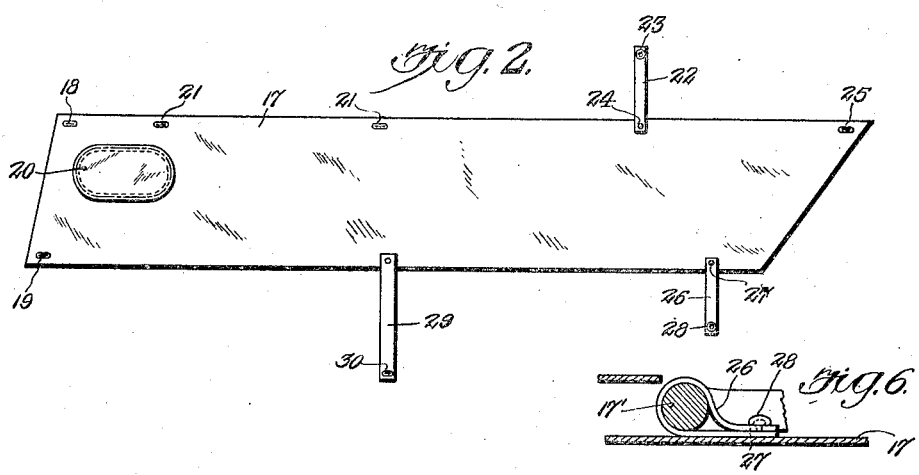
Inventor
G. W. Murphy,
By Mawhinney & Mawhinney
Attorneys Patented Aug. 17, 1926.

1,596,756

UNITED STATES PATENT OFFICE.

GRACE W. MURPHY, OF NURSERY, TEXAS.

AUTO SEMISHADE.

Application filed March 5, 1925. Serial No. 13,326.

The present invention relates to sun shades or visors adapted for attachment to automobiles.

An object of the invention is to provide a sun shade or visor which may be secured optionally upon either side of an automobile in order to intercept the sun's rays, wind or the like from the heads of the occupants of the vehicle, and which at the same time will permit free circulation of air through the side of the vehicle and will also permit free vision through the side of the vehicle beneath the sun shade.

Another object of the invention is to provide a semi-sun shade, or a shade which extends but part or half way down from the top of the vehicle so as to leave a free and uninterrupted space beneath the sun shade for the free passage of air and the like and which will thus not completely enclose the side of the vehicle.

Another object of the invention is to provide a semi-sun shade of this character which is constructed so that it may be quickly applied to the opposite sides of the vehicle top and wind shield, and wherein the usual storm curtain fasteners may be employed for securing the device on either the right or the left hand side of the vehicle without any change or alteration in adjustment or construction of the shade.

Another object of the invention is to provide a sun shade with a transparent or window portion directly opposite the head of the operator so that the operator may obtain an uninterrupted vision of the opposite sides of the roadway whether the sun shade is applied to the right or the left side of the vehicle.

Another object of the invention is to provide a semi-shade of this character which may be applied to either side of a vehicle and to vehicles of either the open or closed types, the closed types being equipped with the usual curtain fasteners when the shade is applied thereto.

With the foregoing and other objects in view, the invention will be more fully described hereinafter, and will be more particularly pointed out in the claim appended hereto.

In the drawings, wherein like symbols refer to like or corresponding parts throughout the several views, Figure 1 is a perspective view of the upper portion of the motor vehicle having a semi-sun shade constructed according to the present invention applied thereto, the shade being shown on the right hand side of the vehicle.

Figure 2 is an enlarged detailed view of the shade removed.

Figure 3 is an enlarged sectional view taken through the shade as applied to the top of the vehicle as shown in Figure 1 substantially on the line 3—3.

Figure 4 is a similar view showing the shade applied to the left hand side of the vehicle.

Figure 5 is an enlarged detail section taken through the lower portion of the shade as applied to the vehicle top in Figure 1, on the line 5—5, and Figure 6 is a similar view showing the mounting of the shade on the opposite or left side of the vehicle.

Referring to the drawing 10 designates a vehicle body, shown in the present instance as of the Ford type and provided with a wind shield 11 having the usual hooks 12 which are secured intermediate the top and bottom lateral edges of the wind shield and upon which the usual storm curtains are adapted to be secured. The vehicle is shown as having the conventional top 13 provided upon its inner side and at its forward corners with turn buttons 14 for supporting the upper corners of the storm curtains, and further provided along its sides with turn buttons 15 and 16′, the latter being located at the rear end of the top. The top 13 is also provided with the side longitudinal ribs 16 and the rear supporting bow 17′ which is pivoted to the upper edge portion of the body 10.

The semi-shade comprises a strip of fabric or the like providing the body portion 17 which may be made in one or more pieces and which is preferably flexible although this is not necessary to the construction and operation of the device. The body portion 17 is of the height or depth equal substantially to half the height of the space between the upper edge of the body 10 and the top 13 of the vehicle and is adapted to be placed in the space and to extend longitudinally therein in the upper half, so as to shade the faces and heads of the occupants against the sun's rays, wind and the like.

The forward end of the shade 17 is provided at its upper corner with an eyelet 18 adapted to detachably and interchangeably fit over the turn buttons 14 at the opposite forward corners of the top 13, and the lower portion of the shade 17 has a projecting forward end adapted to lap slightly about the adjacent side of the wind shield 11 and has an eyelet 19 to detachably and interchangeably engage over the hooks 12.

The transparent pane or window 20 is placed in the body portion 17 near its forward end and upper edge in position such that the operator may observe objects and road conditions at either side of the vehicle so that the shade does not intercept the line of vision and the window 20 is relatively small so that by a slight movement of the head any glare or sun's rays will not strike the face of the operator. The body 17 is further provided along its upper edge with eyelets 21 adapted to detachably engage over the thumb buttons 15 at either side of the top 13, and is provided with a retaining strap 22 which extends from the upper edge of the body 17 and is adapted to be looped interchangeably about the ribs 16 in the opposite sides of the top 13. The strap 22 is provided with a snap fastener 23 adapted to engage over a stud 24 which forms part of a rivet utilized in securing the strap 22 to the body 17.

The rear end of the body 17 of the shade is cut obliquely to conform to the angular position of the rear bow 17' of the top, and is provided with an eyelet 25 at its upper corner adapted to engage over the turn button 16' so as to hold the shade 17 stretched longitudinally in the upper side of the top.

In order to anchor the lower rear edge of the body 17 in place, a second strap 26 is pivotally secured by a stud 27 to the body portion 17 and is adapted to be swung about the stud 27 to the desired angle and to be looped about the intermediate portion of the adjacent bow 17' and to be secured detachably in place by a snap fastener 28 which is adapted to engage over the head of the stud 27. To keep the shade 17 from flapping and to maintain it taut along its lower edge a third strap 29 is secured at its upper end in any suitable manner to the lower edge portion of the body 17 and intermediate its ends, the strap 29 having an eyelet 30 in its lower end adapted to engage over a turn button 31 which is placed at the upper edge portion of the body of the vehicle.

The turn buttons and hooks as above described are a part of the vehicle as at present constructed so that when the shade is applied to the vehicle there is no need of additional fastening devices.

Of course the arrangement of the eyelets and straps on the shade may be changed to meet various conditions and types of vehicle to which it may be applied but the above illustration is for application to vehicles of the most common type.

Figure 3 shows the strap 22 as applied to the rib 16 on the right side of the vehicle and wherein the strap 22 is passed first upwardly between the rib 16 and the depending portion of the top 13.

Figure 4 shows the shade 17 as applied to the rib 16 at the opposite side of the vehicle and wherein the strap 22 is carried upwardly against the inner side of the rib 16 and then looped downwardly between the rib and the depending portion of the top 13.

In like manner, the rear lower strap 26 may be looped about the intermediate portion of either the right or left sides of the bow 17' as shown in Figures 5 and 6, the loop being drawn to either the right or the left side of the shade 17.

It is apparent that the shade 17 may be quickly and easily detached from one side of the vehicle and applied to the other side thereof and that the air may circulate freely beneath the shade so that while the sun's rays are intercepted from striking the faces and heads of the occupants of the vehicle the desired ventilation may be had. This has been a very serious defect in the use of storm curtains and the like to shade the occupants of the vehicle, particularly when on long trips, and it is the object of this invention to overcome these difficulties and permit of the use of a single shade which may be used in either side of the vehicle and in such position as to not detract from the advantages derived in an open vehicle.

It is obvious that various changes and modifications may be made in the details of construction and design of the above specifically described embodiment of this invention without departing from the spirit thereof, such changes and modifications being restricted only by the scope of the following claim.

What is claimed is:—

As an article of manufacture, a semi-shade for vehicles having an open top, comprising an elongated narrow strip adapted to be stretched along in the upper portion of the space between the vehicle body and the top thereof and provided with eyelets at its upper and forward edge portions adapted to engage the usual storm curtain buttons on the vehicle, a top strap carried by the strip adapted to be selectively engaged over the rib of the vehicle top at either of the longitudinal opposite sides thereof, a rear lower strap carried by the strip and adapted to be looped about either side portion of the rear bow of the top, and an intermediate depending strap carried by the strip and adapted to be secured at its lower end to the vehicle body.

In testimony whereof I affix my signature.

GRACE W. MURPHY.